(12) United States Patent
Hoshino et al.

(10) Patent No.: US 8,058,766 B2
(45) Date of Patent: Nov. 15, 2011

(54) ELECTRIC ROTATIONAL MOTOR

(75) Inventors: Akinori Hoshino, Nisshin (JP); Tetsuya Morita, Kariya (JP); Hiroaki Yabui, Nishikamo-gun (JP)

(73) Assignee: Aisin Seiki Kabushiki Kaisha, Aichi-Ken (JP)

( * ) Notice: Subject to any disclaimer, the term of this patent is extended or adjusted under 35 U.S.C. 154(b) by 386 days.

(21) Appl. No.: 12/408,477

(22) Filed: Mar. 20, 2009

(65) Prior Publication Data

US 2009/0243420 A1 Oct. 1, 2009

(30) Foreign Application Priority Data

Mar. 26, 2008 (JP) ................................ 2008-080232

(51) Int. Cl.
*H02K 3/00* (2006.01)

(52) U.S. Cl. ........................................ 310/208; 310/179

(58) Field of Classification Search .................. 310/179, 310/180, 194, 202, 203, 208, 216.005, 216.033, 310/216.036
See application file for complete search history.

(56) References Cited

U.S. PATENT DOCUMENTS

| | | | | |
|---|---|---|---|---|
| 2,647,696 | A * | 8/1953 | Brunand | 242/432.3 |
| 6,255,756 | B1 * | 7/2001 | Richter | 310/208 |
| 6,851,175 | B2 * | 2/2005 | Brown et al. | 29/596 |
| 7,091,645 | B2 * | 8/2006 | Yoneda et al. | 310/208 |
| 7,126,246 | B2 * | 10/2006 | Izumi et al. | 310/208 |
| 7,166,949 | B2 * | 1/2007 | Okada et al. | 310/194 |
| 7,915,778 | B2 * | 3/2011 | Miyata et al. | 310/180 |
| 2003/0048032 | A1 * | 3/2003 | Brown et al. | 310/254 |
| 2004/0263015 | A1 * | 12/2004 | Okada et al. | 310/194 |
| 2005/0029891 | A1 * | 2/2005 | Okada et al. | 310/194 |
| 2006/0119207 | A1 * | 6/2006 | Okada et al. | 310/194 |
| 2008/0035780 | A1 | 2/2008 | Kanoh et al. | |

FOREIGN PATENT DOCUMENTS

JP 2007-215364 A 8/2007
JP 2008-136284 A 6/2008

* cited by examiner

*Primary Examiner* — Quyen Leung
*Assistant Examiner* — Naishadh Desai
(74) *Attorney, Agent, or Firm* — Sughrue Mion, PLLC (57) ABSTRACT

A rotational motor includes a stator formed by a core member including: a magnetic core portion extending in a radial direction of the rotational motor and formed into a fixed shape in every cross section thereof extending orthogonally relative to the radial direction, a coil wound around the magnetic core portion to form a plurality of layers and an engagement member engaging with the coil. A gap is generated between windings of the coil at a predetermined position when an uppermost layer winding portion of the coil is wound in series with a second layer winding portion from an outer side to an inner side of the uppermost layer winding portion in the radial direction. The coil is wound to fill the gap when a winding position of the coil is returned from an innermost side to the outer side of the uppermost layer winding portion in the radial direction.

14 Claims, 8 Drawing Sheets

ELECTRIC ROTATIONAL MOTOR

CROSS REFERENCE TO RELATED APPLICATIONS

This application is based on and claims priority under 35 U.S.C. §119 to Japanese Patent Application 2008-080232, filed on Mar. 26, 2008, the entire contents of which is incorporated herein by reference.

FIELD OF THE INVENTION

The present invention relates to an electric rotational motor having a core member configured by winding a coil around a magnetic core portion.

BACKGROUND

A rotational motor is known having a stator, which configures a plurality of poles by assembling a plurality of core members so as to form a substantially circular shape.

In the above-described rotational motor, a width of the core member in a circumferential direction of the rotational motor is determined to be shorter at an outer side of the core member than at an inner side thereof in a radial direction of the rotational motor (in a radial direction of the circular-shaped stator) when seen from a rotational-shaft-extending direction. In other words, the core member is formed to be accommodated, with a minimum clearance, into a substantially trapezoid shape, whose width at an outer side thereof in the radial direction forms a longer side and whose width at an inner side thereof in the radial direction forms a shorter side being shorter than the longer side thereof. Consequently, the rotational motor is configured to be downsized and to output a high torque by minimizing a clearance generated between the adjacent core members.

A method for accommodating core members into a substantially trapezoid-shape with a minimum clearance is disclosed in JP2007-215364A (which will be referred to as reference 1 herein below). According to reference 1, a magnetic core portion itself is formed into the substantially trapezoid-shape and a coil is wound around a circumference of the magnetic core portion so as to achieve a substantially uniform thickness. A dimension of a cross section of the magnetic core portion is fixed in a magnetic-core-portion-extending direction. Further, a three dimensional shape is adapted in which a thickness thereof is larger at an inner side of the magnetic core portion than an outer side thereof in the radial direction in contrast with a difference in width between the outer side of the magnetic core portion and the inner side thereof in the radial direction, in order to maintain a uniformity of a magnetic flux density (see FIGS. 1 to 3 in reference 1, for example).

Further, a method for having a minimum clearance relative to a predetermined substantially trapezoid-shape is disclosed in reference 1. According to reference 1, a magnetic core portion, extending in the radial direction of the motor, is formed into a substantially fixed shape in every cross section thereof extending orthogonally relative to the magnetic-core-extending direction, so as to maintain a magnetic flux density. A coil is wound to a greater extent around an outer portion of the magnetic core portion than around an inner portion thereof in the radial direction (see FIG. 7 in reference 1, for example).

A method is disclosed in reference 1 by which the three-dimensional magnetic core portion, shown in FIGS. 1 to 3 of reference 1 and having variation in width and thickness thereof, is formed from a pressed powder material. However, the magnetic core portion made of the pressed powder material does not have a sufficient strength. Further, a method for forming the three-dimensional shape is disclosed in reference 1. An additional component is provided to the magnetic core portion, which is formed into the fixed shape in every cross section thereof and which is configured by stacking a plurality of magnetic steel plates conventionally adapted to a usual motor in layers. However, in such case, a manufacturing cost increases because the additional component is required.

On the other hand, the method for having the minimum clearance relative to the predetermined substantially trapezoid-shape is known in which the coil is wound around the magnetic core portion, which is formed into the fixed shape in every cross section thereof in the magnetic-core-portion-extending direction, so as to form a substantially trapezoid-shape. However, in such case, the wound coil is easily unwound. Specifically when a difference between a longer side and a shorter side of a trapezoid-shape is smaller relative to the core member disclosed in FIG. 7 in reference 1, in other words, in an electric rotational motor having a stator of a more number of poles, a wound coil is easily unwound.

Figure 7:
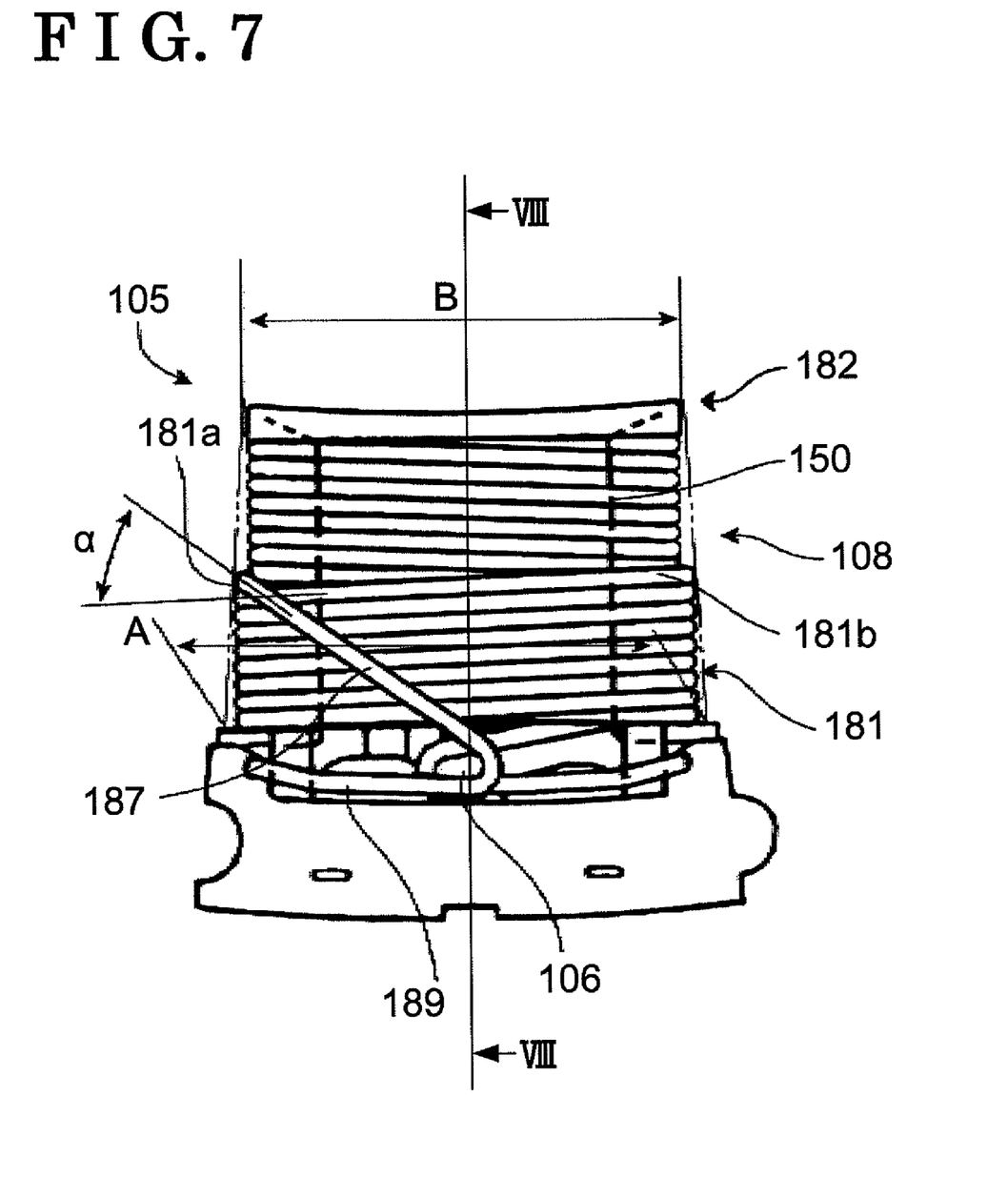
FIG. 7 is a planar view illustrating a conventional core member.
Figure 8:
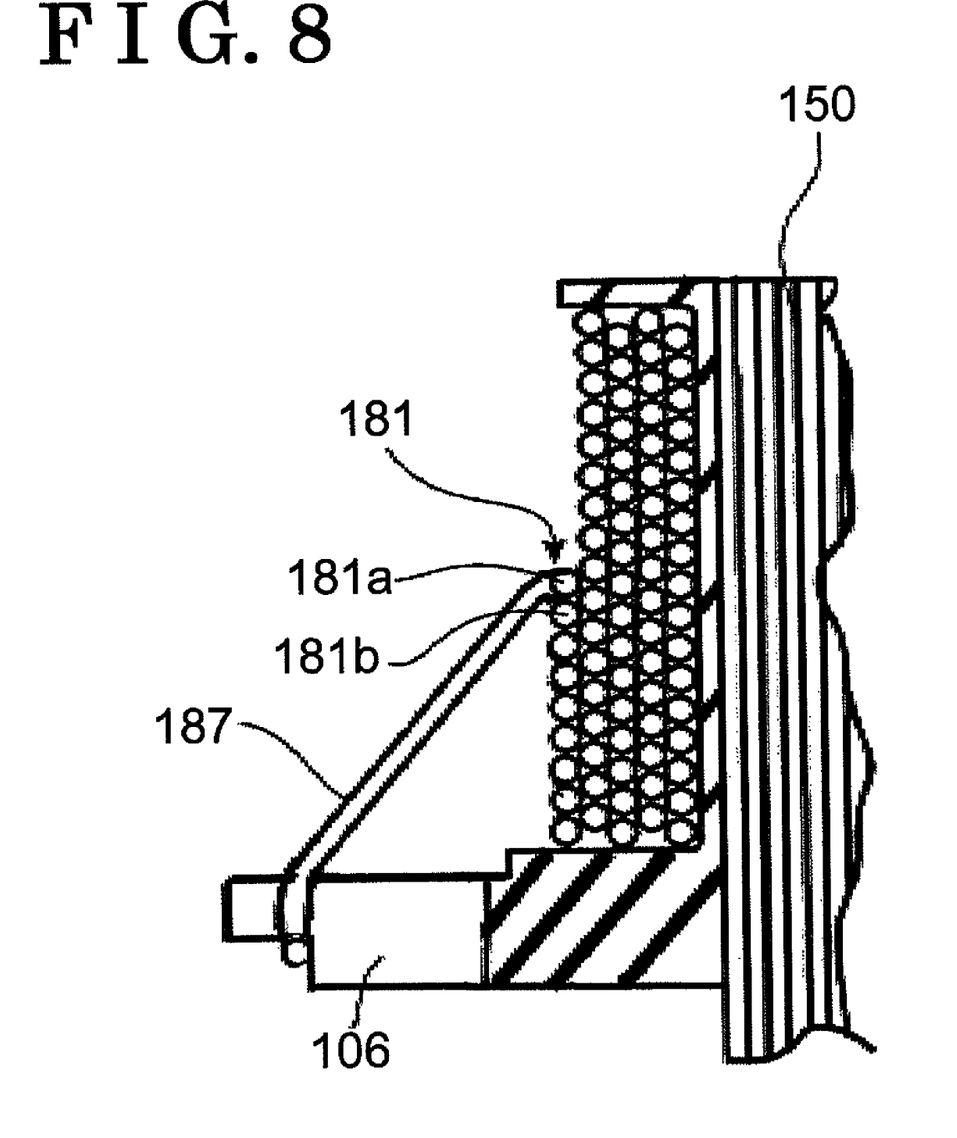
FIG. 8 is a cross-sectional view taken along line VIII-VIII in FIG. 7.

An example of a case where a difference in width between a longer side A and a shorter side B of a trapezoid-shape is small is shown in FIGS. 7 and 8. In the example, a core member 105 is manufactured by a conventional winding method. The core member 105 is configured by winding a coil 108 around a magnetic core portion 150, which extends to be a fixed shape in every cross section thereof. The coil 108 is wound around the magnetic core portion 150 to form a plurality of layers. A winding number of an uppermost layer winding portion 181 is smaller than that of a second layer winding portion 182, which is provided at a lower side of the uppermost layer winding portion 181. ("Upper" and "lower" hereinbelow corresponds to a left side and a right side in FIG. 8, respectively.) Consequently, the core member 105 is accommodated in the trapezoid-shape shown by a double-dashed line in FIG. 7 with a minimum clearance.

A winding number of the uppermost layer winding portion 181 of the core member 105 increases when the difference in width between the longer side A and the shorter side B is small compared to when the difference in width between the longer side A and the shorter side B is large. Therefore, a length between a final winding portion 181a of the uppermost layer winding portion 181 of the coil 108 and an engagement portion 106 increases. Further, a cross angle α between a bridge portion 187, connecting the final winding portion 181a and the engagement portion 106, and a winding portion 181b, wound before the final winding portion 181a, increases.

When the cross angle α is equal to or larger than a predetermined value, the final winding portion 181a crosses over the winding portion 181b to be displaced from a predetermined position during a coil-winding process or a motor-assembling process. Further, as illustrated in FIG. 7, the bridge portion 187 is connected to the engagement portion 106, engaging with an end portion 189 of the coil 108, so as to extend obliquely. Therefore, operators and tools easily contact the bridge portion 187 during the motor-assembly process and the coil is easily unwound.

A need thus exits for an electric rotational motor which is not susceptible to the drawback mentioned above.

SUMMARY OF THE INVENTION

According to an aspect of the present invention, a rotational motor includes a stator formed by a core member including: a magnetic core portion, extending in a radial direction of the rotational motor and formed into a fixed shape in every cross section thereof extending orthogonally relative to the radial direction; coil, wound around the magnetic core portion to form a plurality of layers and having a less winding number thereof at an uppermost layer winding portion of the plurality of layers than a winding number at a second layer winding portion provided at a lower side of the uppermost layer winding portion; and an engagement member, provided at an outer side of the magnetic core portion in the radial direction and engaging with an end portion of the coil. A gap is generated between windings of the coil at a predetermined position when the uppermost layer winding portion of the coil is wound in series with the second layer winding portion from an outer side to an inner side of the uppermost layer winding portion in the radial direction. The coil is wound to fill the gap when a winding position of the coil is returned from an innermost side to the outer side of the uppermost layer winding portion in the radial direction.

BRIEF DESCRIPTION OF THE DRAWINGS

The foregoing and additional features and characteristics of the present invention will become more apparent from the following detailed description considered with the reference to the accompanying drawings, wherein.

DETAILED DESCRIPTION

A detailed description of an embodiment will be described hereinbelow with reference to the attached drawings.

Figure 1:
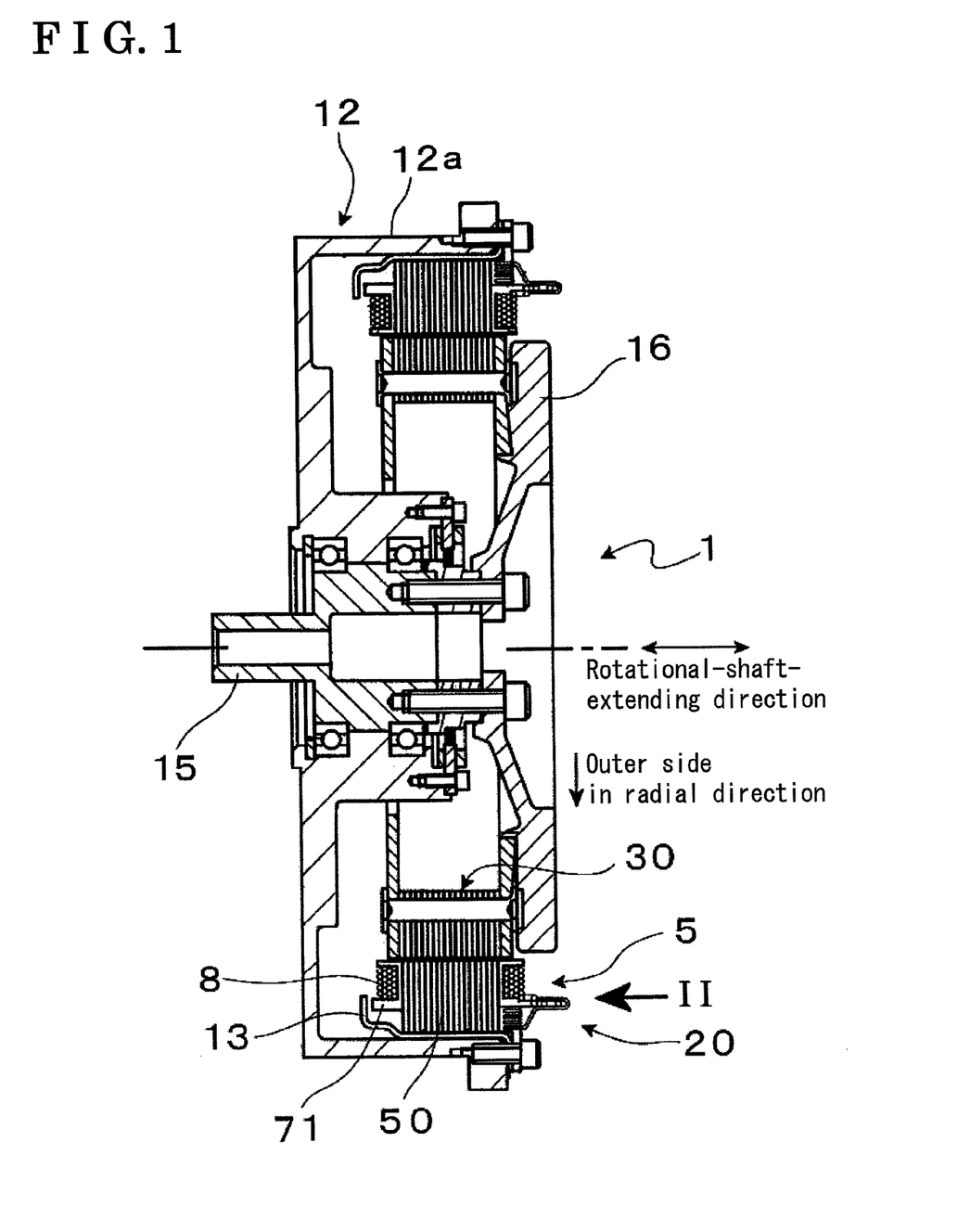
FIG. 1 is a cross-sectional view illustrating an electric rotational motor according to an embodiment.

FIG. 1 is a cross-sectional view illustrating an electric rotational motor (a rotational motor) 1. The electric rotational motor 1 will be referred to as a motor 1 hereinbelow.

The motor 1 includes a housing 12, which is formed into a circular shape. A supporting member 13 is fixed at the housing 12 so as to contact an inner circumference of a cylindrical portion 12a of the housing 12. A plurality of core members 5 is fixed at the housing 12 so as to contact an inner circumference of the supporting member 13.

A rotational shaft 15 is rotatably attached at a central portion of the housing 12. A rotor 30 is fixed at the rotational shaft 15 via a rotational plate 16. A right-left direction in FIG. 1, toward which the rotational shaft 15 extends, will be hereinbelow referred to as a rotational-shaft-extending direction.

Figure 2:
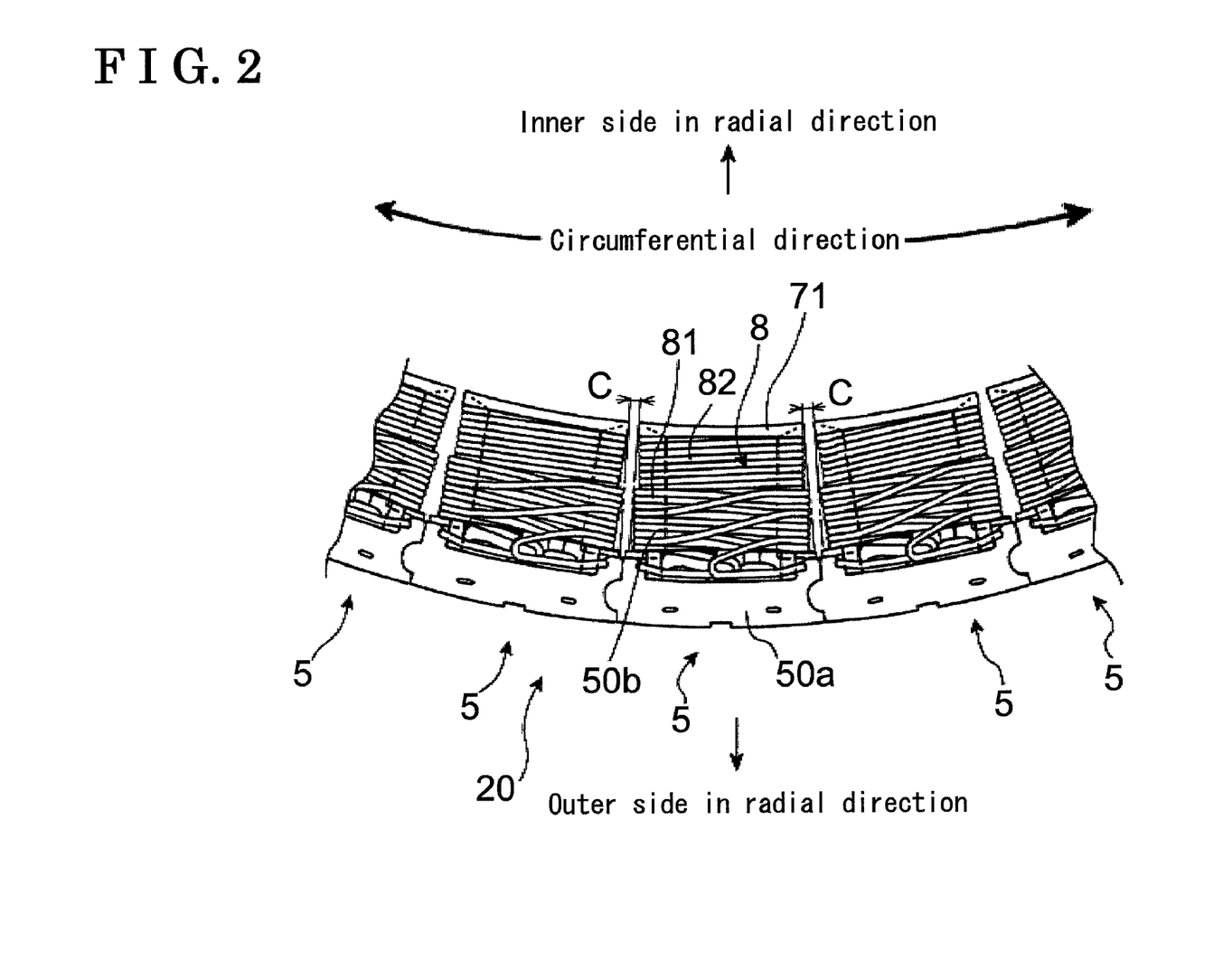
FIG. 2 is a partial view indicated by an arrow II in FIG. 1.

FIG. 2 is a partial view indicated by an arrow II in FIG. 1. A direction, in which the motor 1 rotates, is referred to as a circumferential direction. A direction orthogonal to the circumferential direction is referred to as a radial direction. A direction to be away from a center of a rotational axis of the motor 1 is referred to as an outer side in the radial direction. A direction toward the center of the rotational axis of the motor 1 is referred to as an inner side in the radial direction.

A corresponding number of core members 5 to the number of poles of the motor 1 are connected to contact each other and circularly attached at an inside of the supporting member 13, thereby forming a stator 20. The core members 5 respectively include magnetic cores 50 (see FIG. 1), which are made of a magnetic material. Each of the magnetic cores 50 is formed into a substantially T-shape in a planar view in FIG. 2. The core members 5 are connected to contact each other at yoke portions 50a extending in the circumferential direction. Magnetic core portions 50b are provided at intermediate portions of the corresponding yoke portions 50a so as to extend toward the inner side in the radial direction of the motor 1. The plurality of core members 5 is substantially the same in structure and function. Therefore, only one of the core members 5 will be mainly described hereinbelow as an example.

A bobbin 71 is attached to the magnetic core 50b so as to surround a circumference of the magnetic core portion 50b. A coil 8 is wound around the bobbin 71 so as to form a plurality of layers. An uppermost layer winding portion 81 of the coil 8 and a second layer winding portion 82 of the coil 8, which is provided at a lower side of an uppermost layer, are seen in FIG. 2 as an outer appearance. ("Upper" and "lower" hereinbelow corresponds to a right side and a left side in FIG. 1.)

The second layer winding portion 82 is wound around the bobbin 71 for an entire length defined by the bobbin 71 in the radial direction to achieve the largest winding number. On the other hand, a winding number of the uppermost layer winding portion 81 is smaller than that of the second layer winding portion 82. The winding number of the second layer winding portion 82 is determined so that a clearance C relative to the adjacent core members 5 is a minimum acceptable value and so that the second layer winding portion 82 is accommodated in a trapezoid-shape shown by a double-dashed line in FIG. 2 with a minimum clearance. A width of the magnetic core portion 50b in the circumferential direction is fixed. However, a width of the core member 5 in the circumferential direction is larger at an outer side thereof in the radial direction than at an inner side thereof in the radial direction. Thus, an inner space of the motor 1 is maximally utilized.

Similar to an operation principle of a known motor, the motor 1 outputs a rotational torque from the rotational shaft 15 by means of magnetism between the stator 20 and the rotor 30 when the coil 8 is electrified.

A structure and a manufacturing method of the coil 8 of the core member 5 according to the embodiment will be described hereinbelow.

Figure 6:
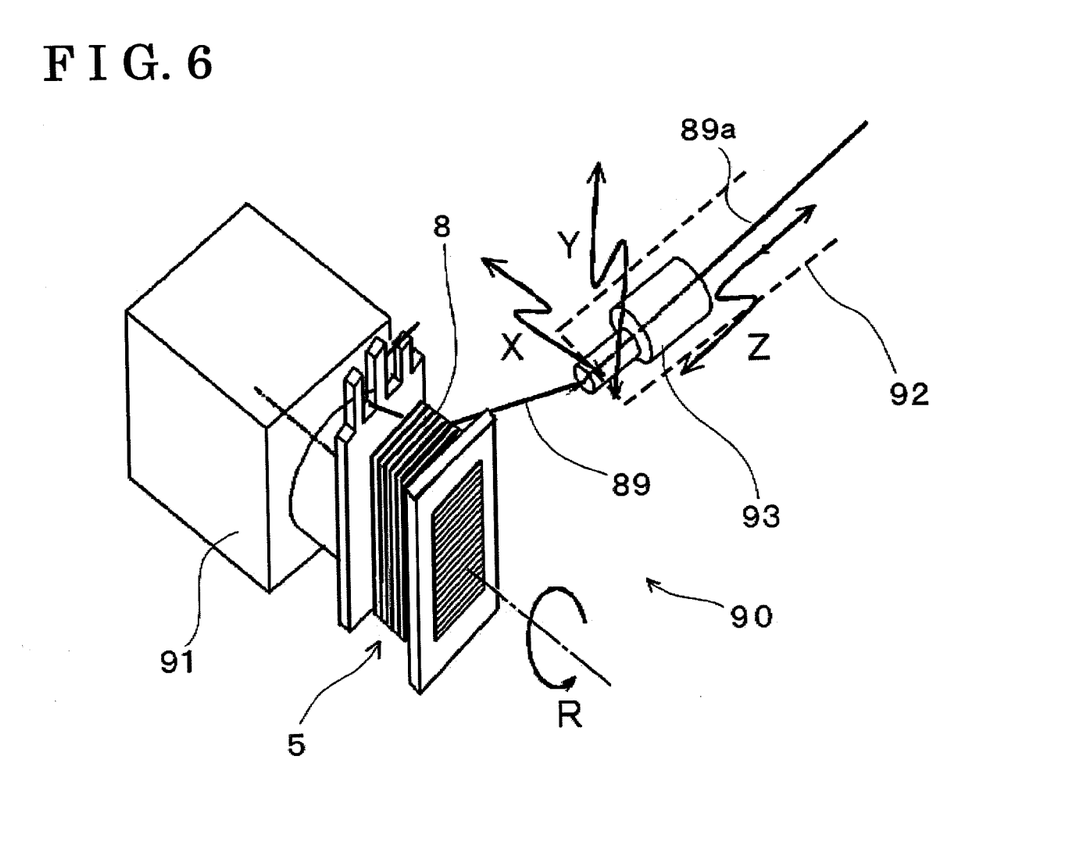
FIG. 6 is a principle diagram illustrating a winding device for manufacturing the core member.

FIG. 6 is a principle diagram illustrating a winding device 90 for manufacturing the core member 5. The winding device 90 includes a rotating station 91 and a wire-supplying station 92. The rotating station 91 rotates while supporting the core member 5. The wire-supplying station 92 supplies a wire 89a, which is integrally connected to an end portion 89 of the coil 8. The wire-supplying station 92 includes a wire-supplying nozzle 93. The wire-supplying nozzle 93 is controlled by a control device to move in X, Y and Z directions of three-dimensional directions shown in FIG. 6. A rotation R of the rotating station 91 is controlled by the control device.

FIGS. 3A to 3F sequentially illustrate a completion of the uppermost layer winding portion 81 in a winding process of the coil 8 operated by the winding device 90.

Figure 3A:
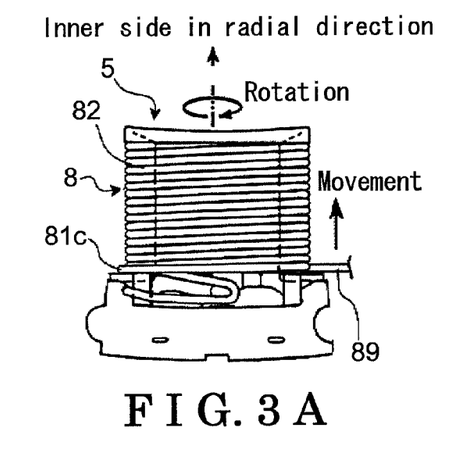
FIG. 3A illustrates a process sequence of winding a coil around a core member of the electric rotational motor according to the embodiment.

FIG. 3A illustrates that a first winding 81c of the uppermost layer winding portion 81 starts to be wound after the coil 8 is wound around the core member 5 to complete winding the second layer winding portion 82. In order to wind the coil 8 around the core member 5, the end portion 89 of the coil 8 is moved in the X direction (see FIG. 6) by one pitch by the wire supplying nozzle 93 so as to synchronize a rotation of the core member 5 while the core member 5 is rotated by one rotation around an axis extending in the radial direction. The end portion 89 is supplied with the wire 89a of a necessary length by the wire-supplying device 92 with an appropriate tension applied thereon.

Figure 3B:
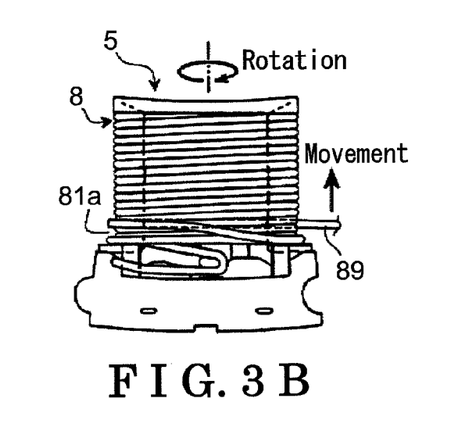
FIG. 3B illustrates the process sequence of winding the coil around the core member of the electric rotational motor according to the embodiment.
Figure 3C:
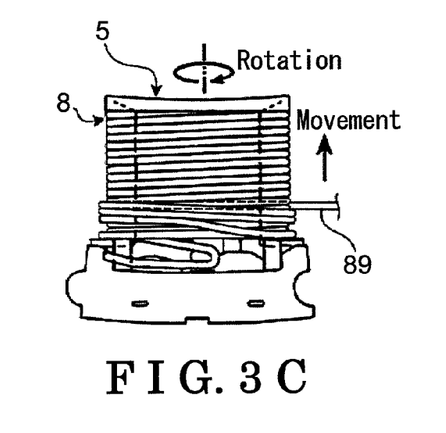
FIG. 3C illustrates the process sequence of winding the coil around the core member of the electric rotational motor according to the embodiment.

As illustrated in FIG. 3B, a first gap 81a (a gap), corresponding to one winding, is generated between the first winding 81c and a second winding by moving the end portion 89 by two pitches while the core member 5 is rotated by one rotation. As illustrated in FIG. 3C, after the first gap 81a is generated, three windings are generated to be adjacent to each other by moving the end portion 89 by one pitch for each rotation of the core member 5.

Figure 3D:
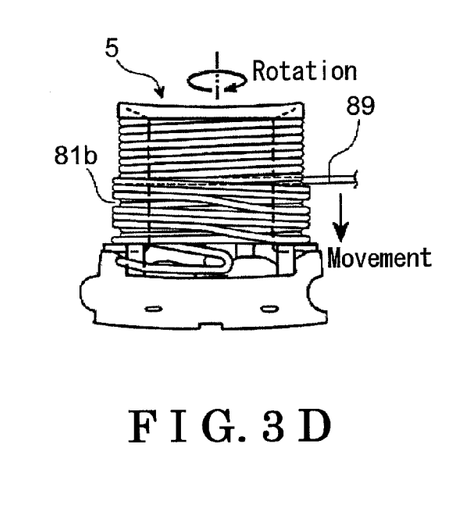
FIG. 3D illustrates the process sequence of winding the coil around the core member of the electric rotational motor according to the embodiment.

As illustrated in FIG. 3D, a second gap 81b (a gap), corresponding to one winding, is generated in a manner similar to generating the first gap 81a. Further, three windings are generated to be adjacent to each other. A width of the coil 8 is a predetermined width at a position shown in FIG. 3D. Then, a moving direction of the end portion 89 is reversed. More specifically, the coil 8 is wound from an outer side to an inner side of the uppermost layer winding portion 81 in the radical direction before the moving direction of the coil 8 is reversed so that the coil 8 is wound from the inner side to the outer side of the uppermost layer winding portion 81 in the radial direction.

Figure 3E:
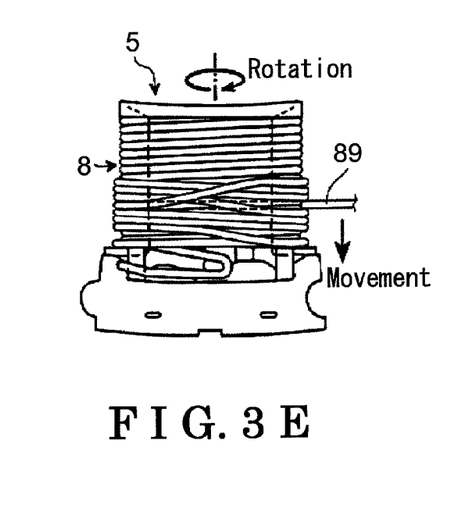
FIG. 3F illustrates the process sequence of winding the coil around the core member of the electric rotational motor according to the embodiment.

After the moving direction of the end portion 89 is reversed, a position of the end portion 89 is returned by a necessary number of pitches so that the second gap 81b, to which the coil 8 is positioned to be the closest, is filled with the coil 8 while the core portion 5 is rotated by one rotation, thereby winding the end portion 89, as illustrated in FIG. 3E.

Figure 3F:
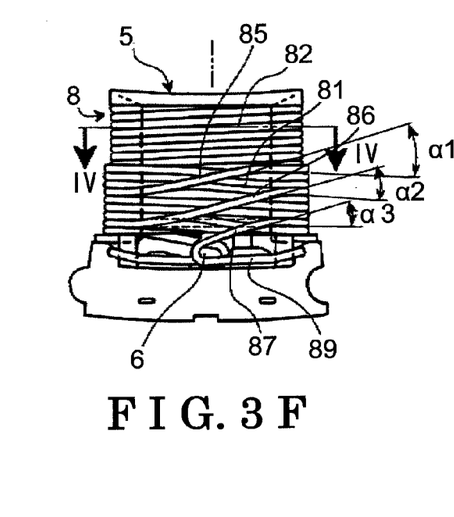

As illustrated in FIG. 3F, the first gap 81a is filled by the coil 8 in a manner similar to filling the second gap 81b. In the final winding process, the end portion 89 is engaged with an engagement portion 6 before being cut from the wire 89a of the wire-supplying device 92.

A manufacturing method, in which the core member 5 is rotated and the end portion 89 is moved, is described above. Instead, a method may be adapted in which the core member is fixed and the end portion 89 is rotated around the core member 5 so as to revolve therearound.

As illustrated in FIG. 3F, when a winding position of the coil 8 is returned from an inner end of the uppermost layer winding portion 81 in the radial direction to the second gap 81b, a portion connecting therebetween is a first bridge portion 85 (a bridge portion). Likewise, as illustrated in FIG. 3F, when a winding position of the coil 8 is returned from the second gap 81b to the first gap 81a, a portion connecting therebetween is a second bridge portion 86 (a bridge portion). Likewise, as illustrated in FIG. 3F, when a winding position of the coil 8 is returned from the first gap 81a to the engagement portion 6, a portion connecting therebetween is a third bridge portion 87 (a bridge portion). Each of the first, second and third bridge portions 85, 86 and 87 is provided to overlap with an upper side of the uppermost layer winding portion 81 and to extend obliquely inwardly relative to the radial direction. Each of the first, second and third bridge portions, 85, 86 and 87 is provided at either end surface of the core member 5 in the rotational-shaft-extending direction so as not to interfere with the adjacent core members 5 and may be provided at the same side as the engagement portion 6. A length of each of the first, second and third bridge portions, 85, 86 and 87 is configured to be minimum.

As illustrated in FIG. 3F, each of the first, second and third bridge portions 85, 86 and 87 and the coil 8, wound around the uppermost layer winding portion 81, form a first cross angle α1 (a cross angle), a second cross angle α2 (a cross angle) and a third cross angle α3 (a cross angle), respectively. The coil 8 is wound with a predetermined tension in the winding process. When each of the first, second and third cross angles α1, α2 and α3 is equal to or more than a predetermined value, the coil 8 is not held at a predetermined position and the coil 8 may be easily unwound. Further, when the motor 1 is operated, the coil 8 may be easily unwound as a result of vibration and an operational force. Experiments show that a coil may be easily unwound when a cross angle is equal to or more than 33 degree in a conventional structure and that the coil 8 is wound so as to prevent from being unwound surely and effectively when each of the first, second and third cross angles α1, α2 and α3 is within a predetermined range from 9 degree to 15 degree, for example, in the above-described structure. According to the above-described embodiment, two of gaps, the first and second gaps 81a and 81b, are provided. However, positions and numbers of gaps are not limited to the above-described structure and may be determined within an appropriate predetermined angle range.

Figure 4:
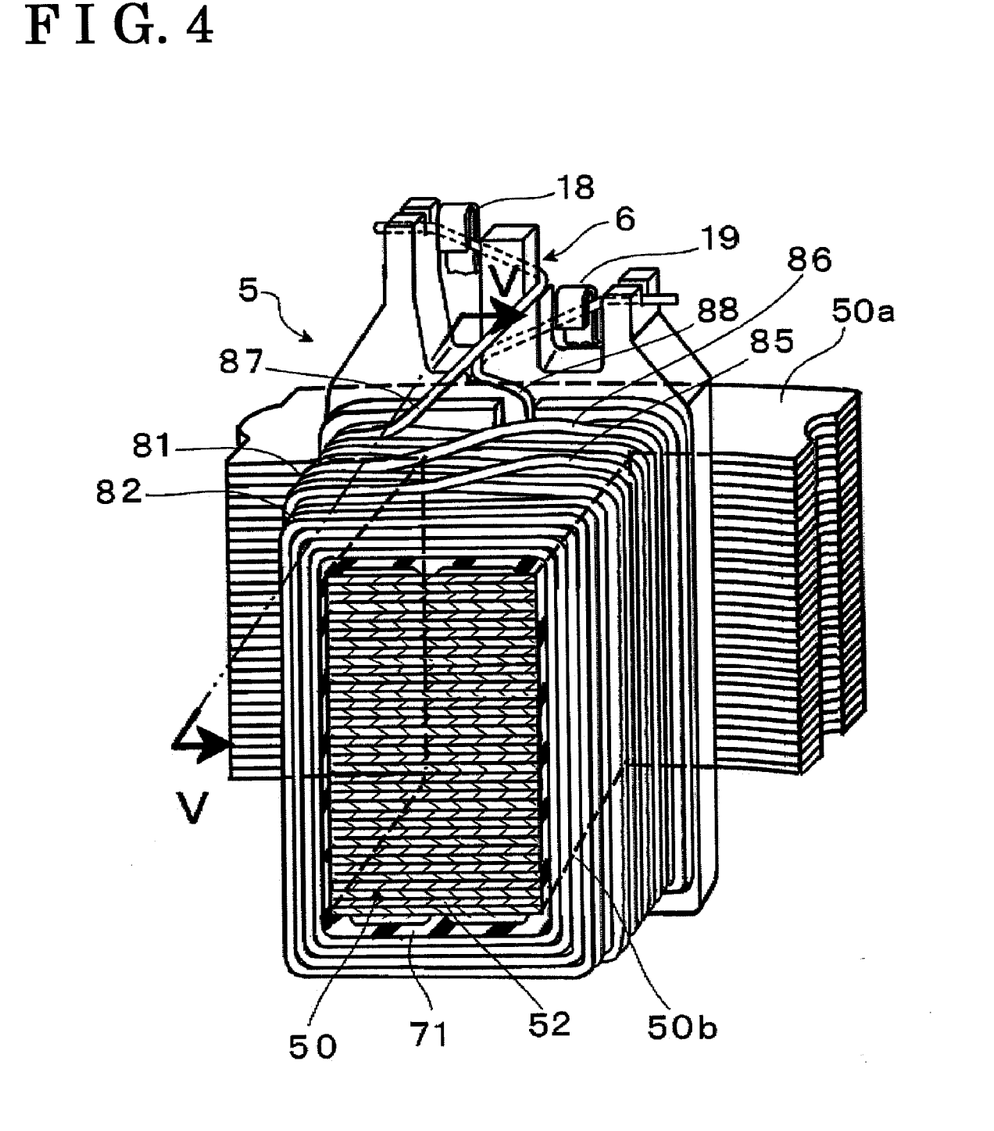
FIG. 4 is a perspective view taken along line IV-IV in FIG. 3F.
Figure 5:
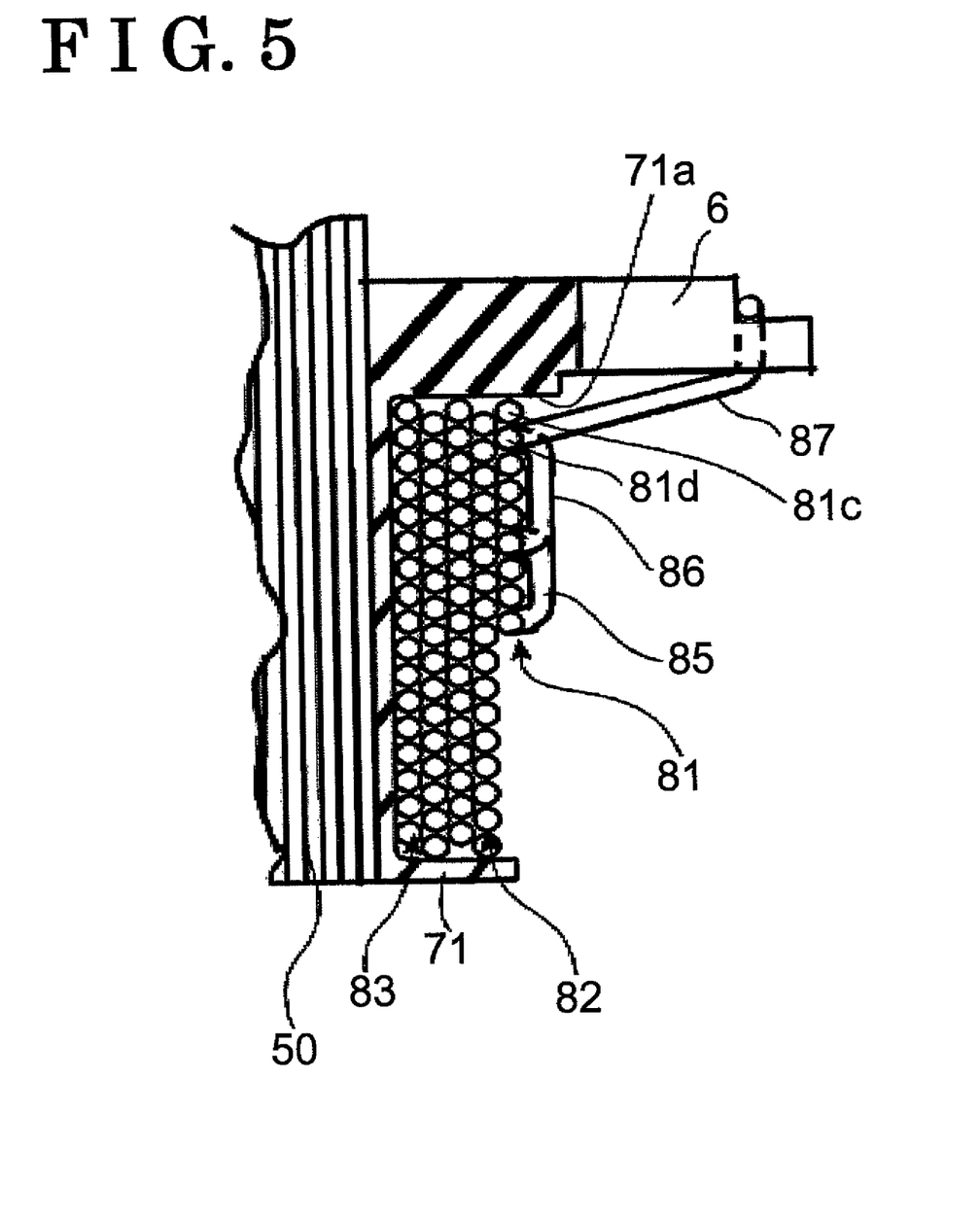
FIG. 5 is a cross-sectional view taken along line V-V in FIG. 4.

FIG. 4 is a perspective view illustrating a cross-sectional surface taken along line IV-IV in FIG. 3F. FIG. 5 is an end view taken along line V-V in FIG. 4.

The third bridge portion 87, which is one terminal of the coil 8, and a conductor portion 88, which is led from a lowermost layer winding portion 83 of the coil 8 and is the other terminal of the coil 8, are engaged with the engagement portion 6. After the core member 5 is assembled to the motor 1, the third bridge portion 87 and the conductor portion 88 are connected to a first power source terminal 18 and a second power source terminal 19, respectively.

As illustrated in FIG. 4, the magnetic core 50 is configured by stacking a plurality of magnetic steel plates 52. The coil 8 is wound around the magnetic core portion 50b via the bobbin 71, which surrounds a circumference of the magnetic core 50. Every cross section of the magnetic core portion 50b, extending orthogonally relative to the radial direction, is formed into a substantially rectangular shape and formed to be a fixed shape in the radial direction. The magnetic core portion 50b and the yoke portion 50a are respectively formed into shapes in which the magnetic core 50 is configured by stacking the same-shaped magnetic steel plates 52 in layers. Therefore, the magnetic steel plates 52 may be manufactured by the same pressing die at a low cost. Further, an additional component is not required.

As illustrated in FIG. 5, the first winding 81c of the uppermost layer winding portion 81 is wound to contact a holding wall 71a of the bobbin 71. A winding position of a final winding 81d, which leads the third bridge portion 87, is surely maintained by contact of the final winding 81d with the first winding 81c. Therefore, a tension applied on the third bridge portion 87 is prevented from being loosened and thereby improving an unwinding prevention effect. Further, the third bridge portion 87 is led by the final winding 81d, which is positioned in the vicinity of the engagement portion 6. Therefore, the third bridge portion 87 extends in a short length. Accordingly, it is prevented that operators or tools contact the third bridge portion 87 in a motor-assembly operation and thereby preventing unwinding.

In the above-described embodiment, a cross section of a wire material of the coil 8 is described as a circular-shaped cross section. However, a core member may be adapted instead which includes a wire material having a different cross section, such as a substantially rectangular-shaped cross section, or the like.

Accordingly, the first, second and third cross angles $\alpha 1$, $\alpha 2$ and $\alpha 3$ between the coil 8 and the bridge portions 85, 86 and 87 respectively are decreased by winding the coil 8 to fill the first and second gaps 81a and 81b, provided at an intermediate portion of the uppermost layer winding portion 81, when the coil 8 is wound from the inner side of the uppermost layer winding portion 81 to the outer side thereof in the radial direction. Consequently, the coil 8 is prevented from being easily unwound.

According to the embodiment, one or more of the first and second gaps 81a and 81b is provided at the uppermost layer winding portion 81. A portion of the coil 8, wound from the innermost side to the outer side of the uppermost layer winding portion 81 in the radial direction and overlapping with the uppermost layer winding portion 81, forms the first, second and third bridge portions 85, 86 and 87. The first, second and third bridge portions 85, 86 and 87, engaged with the engagement portion 6, are provided at an end surface of the magnetic core portion 50b at either side in the rotational-shaft-extending direction where the engagement portion 6 is provided.

Accordingly, each length of the first, second and third bridge portions, 85, 86 and 87 is minimized. Therefore, it is prevented that the operators and the tools contact the first, second and third bridge portions, 85, 86 and 87 (the bridge portion) in the motor-assembly operation and thereby preventing unwinding.

According to the embodiment, the predetermined positions of the first and second gaps 81a and 81b are determined so that the first, second and third cross angles $\alpha 1$, $\alpha 2$ and $\alpha 3$ between the first, second and third bridge portions 85, 86 and 87 respectively and the coil 8 of the uppermost layer winding portion 81 are within the predetermined angle range.

Accordingly, unwinding is surely prevented by determining the first, second and third cross angles $\alpha 1$, $\alpha 2$ and $\alpha 3$ between the coil 8 and the bridge portions 85, 86 and 87 respectively to be within the predetermined range.

According to the embodiment, at least one winding of the coil 8 is wound between the engagement portion 6 and the first gap 81a, provided to be the closest to the engagement portion 6, when the coil 8 of the uppermost layer winding portion 81 is wound in series with the second layer winding portion 82 from the outer side to the inner side of the uppermost layer winding portion 81 in the radial direction.

Accordingly, the winding position of the final winding 81d, which leads the third bridge portion 87, is surely maintained by the contact of the final winding 81d with the first winding 81c. Therefore, a tension applied on the third bridge portion 87 is prevented from being loosened and thereby improving an unwinding prevention effect.

According to the embodiment, the coil 8 is wound around the core member 5 in a manner in which one of the core member 5 and the end portion 89 of the coil 8 is rotated and the other one of the core member 5 and the end portion 89 of the coil 8 is moved synchronously with the rotation in the direction in which the magnetic core portion 50b extends by controlling a speed.

Accordingly, the coil 8 is wound around the core member 5 so as not to be easily unwound.

According to the embodiment, the first, second and third bridge portions 85, 86 and 87 overlap with the uppermost layer winding portion 81 and extend obliquely inwardly relative to the radial direction.

According to the embodiment, the first, second and third cross angles $\alpha 1$, $\alpha 2$ and $\alpha 3$ are within the range from 9 degree to 15 degree.

According to the embodiment, the bobbin 71 is attached to the magnetic core 50b portion so as to surround the circumference of the magnetic core portion 50b. The first winding 81c of the uppermost layer winding portion 81 is wound to contact the holding wall 71a formed at the bobbin 71. The final winding 81d, led by the first, second and third bridge portions 85, 86 and 87 contact the first winding 81c.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A rotational motor comprising:
A stator formed by a core member including
a magnetic core portion extending in a radial direction of the rotational motor and formed into a fixed shape in every cross section thereof extending orthogonally relative to the radial direction,
a coil wound around the magnetic core portion to form a plurality of layers and having a less winding number thereof at an uppermost layer winding portion of the plurality of layers than a winding number at a second layer winding portion provided at a lower side of the uppermost layer winding portion, and
an engagement member provided at an outer side of the magnetic core portion in the radial direction and engaging with an end portion of the coil, wherein
a gap is generated between windings of the coil at a predetermined position when the uppermost layer winding portion of the coil is wound in series with the second layer winding portion from an outer side to an inner side of the uppermost layer winding portion in the radial direction, and wherein
the coil is wound to fill the gap when a winding position of the coil is returned from an innermost side to the outer side of the uppermost layer winding portion in the radial direction.

2. The rotational motor according to claim 1, wherein
one or more of the gap is provided at the uppermost layer winding portion, and
a portion of the coil wound from the innermost side to the outer side of the uppermost layer winding portion in the radial direction and overlapping with the uppermost layer winding portion forms a bridge portion,
the bridge portion being engaged with the engagement portion and provided at an end surface of the magnetic core portion at either side in a rotational-shaft-extending direction where the engagement portion is provided.

3. The rotational motor according to claim 2, wherein
the predetermined position of the gap is determined so that a cross angle between the bridge portion and the coil of the uppermost layer winding portion is within a predetermined angle range.

4. The rotational motor according to claim 1, wherein
at least one winding of the coil is wound between the engagement portion and the gap, provided to be the closest to the engagement portion, when the coil of the uppermost layer winding portion is wound in series with the second layer winding portion from the outer side to the inner side of the uppermost layer winding portion in the radial direction.

5. A method for manufacturing the rotational motor according to claim 1, wherein the coil is wound around the core member in a manner in which one of the core member and the end portion of the coil is rotated and the other one of the core member and the end portion of the coil is moved synchronously with the rotation in a direction in which the magnetic core portion extends by controlling a speed.

6. The rotational motor according to claim 2, wherein
at least one winding of the coil is wound between the engagement portion and the gap, provided to be the closest to the engagement portion, when the coil of the uppermost layer winding portion is wound in series with the second layer winding portion from the outer side to the inner side of the uppermost layer winding portion in the radial direction.

7. The rotational motor according to claim 3, wherein
at least one winding of the coil is wound between the engagement portion and the gap, provided to be the closest to the engagement portion, when the coil of the uppermost layer winding portion is wound in series with the second layer winding portion from the outer side to the inner side of the uppermost layer winding portion in the radial direction.

8. The rotational motor according to claim 2, wherein
the bridge portion overlaps with the uppermost layer winding portion and extends obliquely inwardly relative to the radial direction.

9. The rotational motor according to claim 3, wherein
the bridge portion overlaps with the uppermost layer winding portion and extends obliquely inwardly relative to the radial direction.

10. The rotational motor according to claim 3, wherein
the cross angle is within a range from 9 degree to 15 degree.

11. The rotational motor according to claim 2, wherein
a bobbin is attached to the magnetic core portion so as to surround a circumference of the magnetic core portion,
a first winding of the uppermost layer winding portion is wound to contact a holding wall formed at the bobbin, and
a final winding, led by the bridge portion, contacts the first winding.

12. The rotational motor according to claim 3, wherein
a bobbin is attached to the magnetic core portion so as to surround a circumference of the magnetic core portion,
a first winding of the uppermost layer winding portion is wound to contact a holding wall formed at the bobbin, and
a final winding, led by the bridge portion, contacts the first winding.

13. The rotational motor according to claim 8, wherein
a bobbin is attached to the magnetic core portion so as to surround a circumference of the magnetic core portion,
a first winding of the uppermost layer winding portion is wound to contact a holding wall formed at the bobbin, and
a final winding, led by the bridge portion, contacts the first winding.

14. The rotational motor according to claim 10, wherein
a bobbin is attached to the magnetic core portion so as to surround a circumference of the magnetic core portion,
a first winding of the uppermost layer winding portion is wound to contact a holding wall formed at the bobbin, and
a final winding, led by the bridge portion, contacts the first winding.

* * * * *